(12) United States Patent
Camble et al.

(10) Patent No.: US 7,062,614 B2
(45) Date of Patent: *Jun. 13, 2006

(54) SYSTEM AND METHOD FOR MANAGING ACCESS TO MULTIPLE DEVICES IN A PARTITIONED DATA LIBRARY

(75) Inventors: Peter Thomas Camble, Bristol (GB); Stephen Gold, Bristol (GB); Curtis C. Ballard, Eaton, CO (US); Stan S. Feather, Longmont, CO (US); Jeffrey Dicorpo, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 747 days.

This patent is subject to a terminal disclaimer.

(21) Appl. No.: 10/032,662

(22) Filed: Dec. 28, 2001

(65) Prior Publication Data

US 2003/0126309 A1    Jul. 3, 2003

(51) Int. Cl.
*G06E 12/00* (2006.01)
(52) U.S. Cl. ............... 711/152; 711/153; 711/154
(58) Field of Classification Search ........... 711/152, 711/153, 154
See application file for complete search history.

(56) References Cited

U.S. PATENT DOCUMENTS

| 5,070,404 A | 12/1991 | Bullock et al. |
|---|---|---|
| 5,164,909 A | 11/1992 | Leonhardt et al. |
| 5,303,214 A | 4/1994 | Kulakowski et al. |
| 5,367,669 A | 11/1994 | Holland et al. |
| 5,416,914 A | 5/1995 | Korngiebel et al. |
| 5,442,771 A | 8/1995 | Filepp et al. |
| 5,455,409 A | 10/1995 | Smith et al. |
| 5,613,154 A | 3/1997 | Burke et al. |
| 5,734,859 A | 3/1998 | Yorimitsu et al. |
| 5,802,278 A | 9/1998 | Isfeld et al. |
| 5,805,864 A | 9/1998 | Carlson et al. |
| 5,819,309 A | 10/1998 | Gray |
| 5,835,940 A | 11/1998 | Yorimitsu et al. |
| 5,867,335 A | 2/1999 | Ozue et al. |
| 5,867,736 A | 2/1999 | Jantz |
| 5,883,864 A | 3/1999 | Saliba et al. |
| 5,890,014 A | 3/1999 | Long |
| 5,943,688 A | 8/1999 | Fisher et al. |

(Continued)

FOREIGN PATENT DOCUMENTS

EP    0859308    8/1998

(Continued)

OTHER PUBLICATIONS

Foreign Search Report dated Feb. 13, 2003.

(Continued)

*Primary Examiner*—Trong Phan

(57) ABSTRACT

A data library system with managed device access comprises at least one partition, a plurality of data transfer elements each of the data transfer elements assigned to a partition, a plurality of data storage element slots, each of the slots assigned to a partition, a library controller comprising a virtual controller for each partition, the virtual controller directing movement of the media to and from the slots assigned to a same partition and to and from the data transfer elements assigned to the same partition, and at least one bridge operatively disposed between at least one user and the library, each of the bridges present the data transfer elements and the virtual controllers of each partition to the users as logical components beginning at a same designation for each partition.

34 Claims, 7 Drawing Sheets

U.S. PATENT DOCUMENTS

| | | | |
|---|---|---|---|
| 5,970,030 A | 10/1999 | Dimitri et al. | |
| 6,038,490 A | 3/2000 | Dimitri et al. | |
| 6,044,442 A | 3/2000 | Jesionowski | |
| 6,052,341 A | 4/2000 | Bingham et al. | |
| 6,084,736 A | 7/2000 | Kurokawa et al. | |
| 6,085,123 A | 7/2000 | Baca et al. | |
| 6,247,096 B1 | 6/2001 | Fisher et al. | |
| 6,295,578 B1 | 9/2001 | Dimitroff et al. | |
| 6,335,927 B1 | 1/2002 | Elliott et al. | |
| 6,336,163 B1 | 1/2002 | Brewer et al. | |
| 6,336,172 B1 | 1/2002 | Day, III et al. | |
| 6,421,196 B1 | 7/2002 | Takayama et al. | |
| 6,421,711 B1 | 7/2002 | Blumenau et al. | |
| 6,425,059 B1 * | 7/2002 | Basham et al. | 711/153 |
| 6,446,141 B1 | 9/2002 | Nolan et al. | |
| 6,502,162 B1 | 12/2002 | Blumenau et al. | |
| 6,507,896 B1 | 1/2003 | Sanada et al. | |
| 6,519,678 B1 | 2/2003 | Basham et al. | |
| 6,535,964 B1 | 3/2003 | Sanada et al. | |
| 6,574,667 B1 | 6/2003 | Blumenau et al. | |
| 6,606,664 B1 | 8/2003 | Darago et al. | |
| 6,618,796 B1 | 9/2003 | Yamakawa et al. | |
| 6,636,958 B1 | 10/2003 | Abboud et al. | |
| 6,681,303 B1 | 1/2004 | Watanabe et al. | |
| 6,725,394 B1 | 4/2004 | Bolt | |
| 6,731,625 B1 | 5/2004 | Eastep et al. | |
| 6,742,034 B1 | 5/2004 | Schubert et al. | |
| 6,799,255 B1 | 9/2004 | Blumenau et al. | |
| 6,813,698 B1 | 11/2004 | Gallo et al. | |
| 6,823,398 B1 | 11/2004 | Lee et al. | |
| 6,832,287 B1 | 12/2004 | Beeston et al. | |
| 6,842,784 B1 | 1/2005 | Black | |
| 6,850,380 B1 | 2/2005 | Basham et al. | |
| 2001/0044877 A1 | 11/2001 | Kanazawa et al. | |
| 2002/0194294 A1 | 12/2002 | Blumenau et al. | |

FOREIGN PATENT DOCUMENTS

| | | |
|---|---|---|
| EP | 0 978 841 | 2/2000 |
| EP | 1 039 410 | 9/2000 |
| EP | 1156408 | 11/2001 |
| JP | 09185465 | 7/1997 |
| JP | 10269026 | 10/1999 |
| JP | 2001014257 | 1/2001 |
| JP | 2002304791 | 10/2002 |

OTHER PUBLICATIONS

IBM Technical Disclosure Bulletin, "Optical Disk Drive Loader for Work Station with Pluggable Magazine", vol. 38, No. 12, Dec. 1955, pp. 243-246.

IBM Technical Disclosure Bulletin, "Logical Grouping of Data Storage Media in a Library System", vol. 35, No. 5, Oct. 1992—pp. 17-20.

Massiglia, P., "The Raid Book", 6th edition, Feb. 1997, 83 pages.

"Sharing Backup Resources," Ralph Cuellar; Apr. 2000.

"The Gator Tape Library Family Architecture," John Kranz; Oct. 1999.

"Fibre Channel Fundamentals," Tom Weimer.

"Spectra 12000 User Guide," Sep. 2000.

European Search Report issued for EP 02 25 8806, dated Jan. 4, 2005.

* cited by examiner

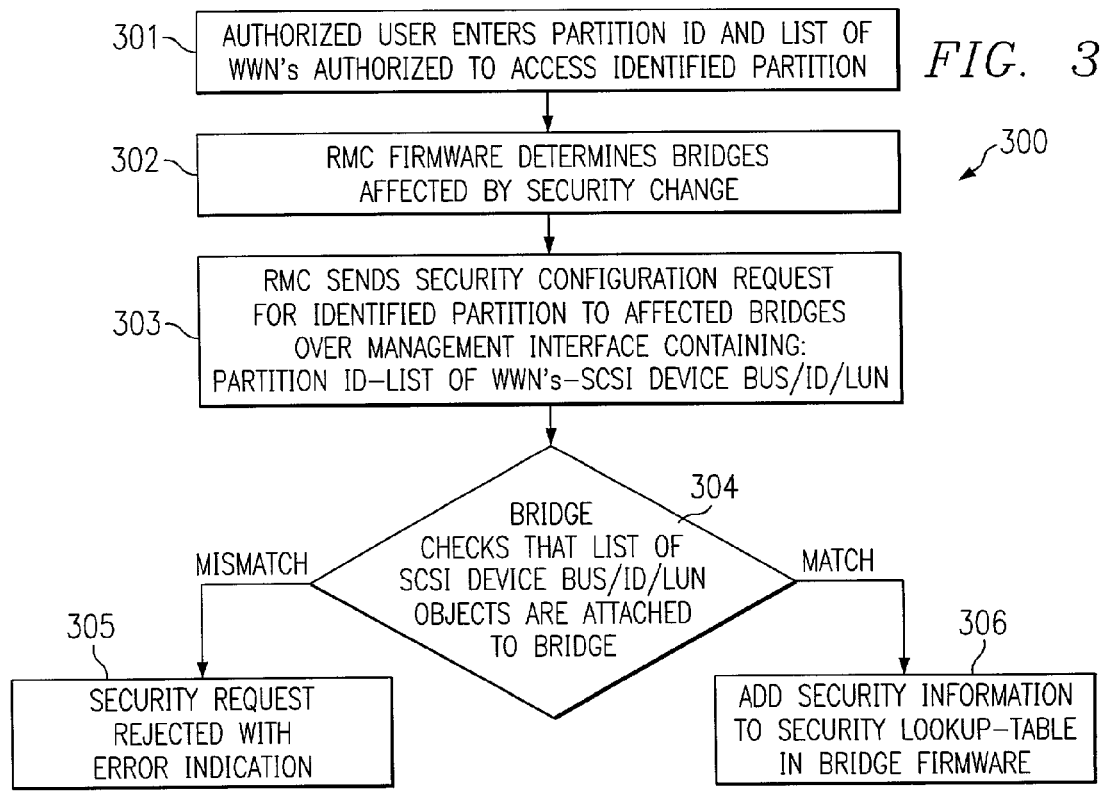

| HOST | PARTITIONS ACCESSIBLE | DEVICES ACCESSIBLE |
|---|---|---|
| HOST WITH WWN_1 | PARTITION 0 (215)<br>PARTITION 2 (217) | TAPE DRIVE 0 (201)<br>TAPE DRIVE 1 (202)<br>CONTROLLER (213 LUN0)<br>TAPE DRIVE 3 (204)<br>CONTROLLER (213 LUN2) |
| HOST WITH WWN_2 | PARTITION 1 (216)<br>PARTITION 2 (217) | TAPE DRIVE 2 (203)<br>CONTROLLER (213 LUN1)<br>TAPE DRIVE 3 (204)<br>CONTROLLER (213 LUN2) |
| OTHER HOSTS | PARTITION 2 (217) | TAPE DRIVE 3 (204)<br>CONTROLLER (213 LUN2) |

| DEVICE FC ADDRESSES PRESENTED BY BRIDGE TO HOST(S) | DEVICE SCSI ADDRESSES INTERNAL TO BRIDGE | DEVICE SCSI ADDRESSES PRESENTED BY HOST HBA DRIVER TO HOST SOFTWARE |
|---|---|---|
| BRIDGE 0 (210) FC TARGET ID/LUN0<br>BRIDGE 0 (210) FC TARGET ID/LUN1<br>BRIDGE 0 (210) FC TARGET ID/LUN2 | BRIDGE 0 (210)/SCSI BUS1/ID0/LUN0 (409)<br>BRIDGE 0 (210)/SCSI BUS0/ID1/LUN0 (410)<br>BRIDGE 0 (210)/SCSI BUS0/ID4/LUN0 (411) | SCSI BUS0/ID0/LUN0<br>SCSI BUS0/ID0/LUN1<br>SCSI BUS0/ID0/LUN2 |
| BRIDGE 1 (211) FC TARGET ID/LUN0<br>BRIDGE 0 (210) FC TARGET ID/LUN3 | BRIDGE 1 (211)/SCSI BUS1/ID3/LUN0 (413)<br>BRIDGE 0 (210)/SCSI BUS0/ID4/LUN2 (412) | SCSI BUS0/ID1/LUN0<br>SCSI BUS0/ID0/LUN3 |
| BRIDGE 1 (211) FC TARGET ID/LUN0<br>BRIDGE 0 (210) FC TARGET ID/LUN0 | BRIDGE 1 (211)/SCSI BUS0/ID2/LUN0 (415)<br>BRIDGE 0 (210)/SCSI BUS0/ID4/LUN1 (414) | SCSI BUS0/ID1/LUN1<br>SCSI BUS0/ID0/LUN0 |
| BRIDGE 1 (211) FC TARGET ID/LUN1<br>BRIDGE 0 (210) FC TARGET ID/LUN1 | BRIDGE 1 (211)/SCSI BUS1/ID3/LUN0 (413)<br>BRIDGE 0 (210)/SCSI BUS0/ID4/LUN2 (412) | SCSI BUS0/ID1/LUN1<br>SCSI BUS0/ID0/LUN1 |
| BRIDGE 1 (211) FC TARGET ID/LUN0<br>BRIDGE 0 (210) FC TARGET ID/LUN0 | BRIDGE 1 (211)/SCSI BUS1/ID3/LUN0 (413)<br>BRIDGE 0 (210)/SCSI BUS0/ID4/LUN2 (412) | SCSI BUS0/ID1/LUN0<br>SCSI BUS0/ID0/LUN0 |

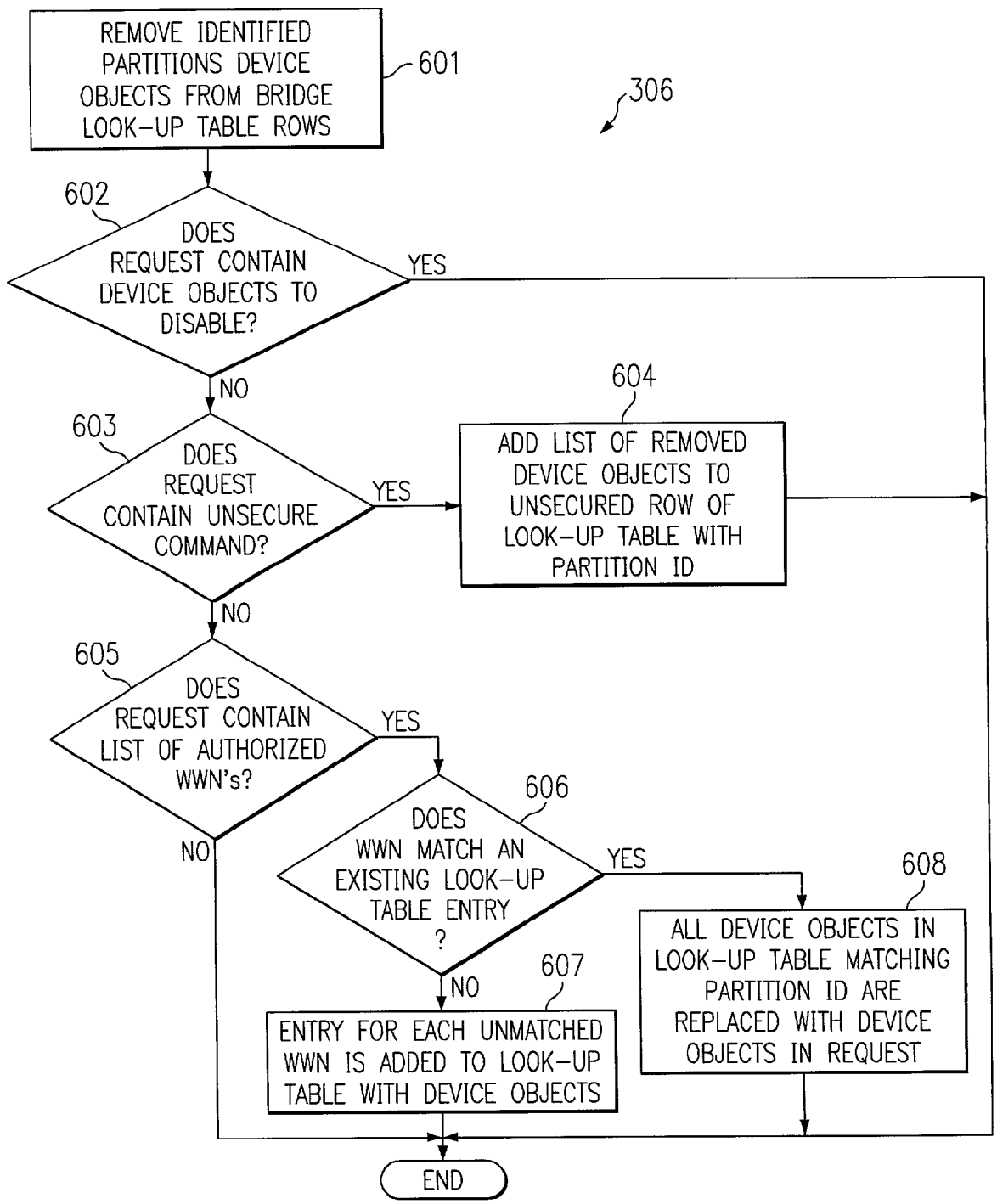

SYSTEM AND METHOD FOR MANAGING ACCESS TO MULTIPLE DEVICES IN A PARTITIONED DATA LIBRARY

RELATED APPLICATIONS

The present invention is related to the following copending and commonly assigned United States patent applications: System and Method for Partitioning a Storage Area Network Associated Data Library, filed Dec. 28, 2001 and issued as U.S. Pat. No. 6,715,031; System and Method for Partitioning A Storage Area Network Associated Data Library Employing Element Addresses, filed Dec. 28, 2001 and issued as U.S. Pat. No. 6,839,824; Ser. No. 10/032,923, entitled System and Method for Peripheral Device Virtual Functionality Overlay, filed Dec. 28, 2001; Ser. No. 10/034,518, entitled System and Method for Securing Drive Access to Media Based On Medium Identification Numbers, filed Dec. 28, 2001; Ser. No. 10/034,888, entitled System and Method for Securing Drive Access to Data Storage Media Based On Medium Identifiers, filed Dec. 28, 2001; Ser. No. 10/033,010, entitled System and Method for Securing Fiber Channel Drive Access in a Partitioned Data Library, filed Dec. 28, 2001; Ser. No. 10/033,003, entitled Method for Using Partitioning to Provide Capacity on Demand in Data Libraries, filed Dec. 28, 2001; System and Method for Intermediating Communication with a Moveable Media Library Utilizing a Plurality of Partitions, filed Dec. 28, 2001 and issued as U.S. Pat. No. 6,845,431; and Ser. No. 10/034,083, entitled System and Method for Managing a Moveable Media Library with Library Partitions, filed Dec. 28, 2001; the disclosures of which are hereby incorporated herein by reference.

TECHNICAL FIELD

The present invention generally relates to data storage; and more specifically to a system and method of managing access to multiple devices employed in a partitioned data tape library.

BACKGROUND

In certain storage area network (SAN) usage scenarios, such as those encountered by storage service providers (SSPs), there are multiple customers attempting to share common SAN resources. In such cases, there is a need to ensure that customers can only see and access the storage resources they have been allocated and prevent them from accessing storage of other customers. For example, if a customer stores their critical business data with a SSP, then they generally do not want other customers of the SSP reading their data or even being aware that they have information stored with the SSP. Thus, there is a need to secure the storage device resources so that only specified users or equipment connected to the SAN can access or be aware of those resources.

Further problems arise in some storage devices that can be subdivided into multiple separate resources. For example, a disk array can have multiple redundant arrays of independent disks (RAID) or partitions defined where each RAID set appears as a different fibre channel (FC) logical unit number (LUN). Each one of these FC LUNs can be dedicated to a different server. Therefore, it may not be possible to secure the resources of a SAN whole-device by whole-device. Instead, the SAN resources may need to be secured at the LUN level.

Existing fibre channel (FC) disk array firmware may be used to provide security in an FC redundant array of independent disks (RAID), since the disk array firmware has direct control over the array's ports connected to the SAN. Every host and device connection into the SAN generally has a unique FC-based world-wide-name (WWN), which can be used by an FC-based RAID to uniquely identify a device or host connection. Therefore, the FC-disk array firmware may be configured so that when a host attempts to send a small computer systems interface (SCSI) command to a FC-logical unit number (LUN) inside the RAID, the firmware will check the originating WWN from the server that sent the command against a list of authorized WWNs. If the WWN is on the list of authorized WWNs for that RAID FC-LUN, the SCSI command may be processed, if the WWN is not on the list of authorized WWNs for the RAID FC-LUN the command will be rejected. The list of authorized WWN's for each RAID FC-LUN may be configured via the existing management software for the RAID.

However, if an existing SCSI device such as a data tape library is connected to a FC-based SAN via a FC-to-SCSI bridge, it is not possible with existing security measures to secure these devices so that only certain hosts can see and access them. For example, if a tape library is connected to a SAN via a FC-to-SCSI bridge, then it is visible to and accessible by every server connected to that SAN. This is unacceptable from a data security standpoint for a SAN that provides storage resources to different customers.

Existing FC switches are capable of configuring security "zones" that define what WWNs or FC ports of servers can recognize listed WWN's or FC ports of devices. Such FC port and WWN security does not extend to FC addresses or FC device LUNs. Therefore, it is only possible to secure at the FC port level using existing FC switches on switch zoning.

Even were FC switches developed that have the capability of defining security zones down to the device LUN level, for SCSI tape libraries attached behind FC bridges, it still would be impractical for a user to define security zones. The tape library may have multiple FC bridges, with each bridge connected to a subset of the library tape drives. Additionally, the tape library may be logically partitioned, and such partitions may extend across multiple FC bridges. For example, a tape library partition may use three tape drives connected to two different FC bridges. It would be impractical for a user to correctly identify which FC ports and LUNs are associated together in the same security zone for an existing switch with any certainty. Understandably, mistakes may easily be made in such a manual process. Furthermore, to use existing switch zoning with a partitioned SCSI-based tape library the library controller should be on a separate bridge from any drives. This would require existing libraries to support two bridges per level, at least on one level, which existing libraries cannot do. Another problem is that switch zoning must be carried out per-bridge, so there would be a two drive per partition restriction/requirement for partitioned SCSI tape libraries connected to a SAN using existing FC-to-SCSI bridges.

SUMMARY OF THE INVENTION

A data library system with managed device access comprises at least one partition, a plurality of data transfer elements each of the data transfer elements assigned to a partition, a plurality of data storage element slots, each of the slots assigned to a partition, a library controller comprising a virtual controller for each partition, the virtual controller directing movement of the media to and from the slots assigned to a same partition and to and from the data transfer elements assigned to the same partition, and at least one bridge operatively disposed between at least one user and the library, each of the bridges present the data transfer elements and the virtual controllers of each partition to the users as logical components beginning at a same designation for each partition.

BRIEF DESCRIPTION OF THE DRAWING

FIG. 3 is a flow chart of implementation of a security configuration change request in accordance with the present system and method;

FIG. 4 is a diagrammatic representation of firmware look-up tables for the two bridges of FIG. 2A in accordance with the present system and method;

FIGS. 5A and 5B are each a partial view comprising a diagrammatic representation of device mapping of the look-up tables of FIG. 4 in accordance with the present system and method; and FIG. 6 is a flow chart of an example implementation of the security change of FIG. 3 by a firmware look-up table in accordance with the present system and method.

DETAILED DESCRIPTION

The present invention is directed to systems and methods which provide managed host access to multiple standard SCSI devices in a partitioned data library. Preferably this access is provided in a secure, yet OS-friendly, manner and may be carried out via a fiber channel-SCSI bridge. The present inventive systems and methods preferably present various subsets, including empty subsets, of a population of SCSI library devices behind a FC-to-SCSI bridge to different initiators by keying on the initiators' FC world-wide-names (WWNs). The present systems and methods preferably employ FC security for FC-to-SCSI bridges connected to a partitioned data library.

The present invention addressees problems that may arise in the case of some operating systems (OSs) or storage applications for tape libraries and backup applications where storage devices recognized by a server do not start at LUN-0. For example, an OS or backup application might ignore devices at a SCSI-ID which maps to a FC port if LUN-0 was not detected for that SCSI-ID during boot-up operations or the like. The present invention allows SCSI devices with one or more LUNs to be secured via a FC-to-SCSI bridge, while presenting devices that start at LUN-0 regardless of the host accessing the FC-to-SCSI bridge.

Preferably, in the present invention each library bridge has a separate target SCSI-ID, with accessible components or elements behind the bridge presented as LUNs starting from a same designation, preferably zero. However, the library's host bus adapter configuration preferably determines how these LUNs are presented. Additionally, the present system and method preferably ensures that if multiple LUN-based library partitions are defined on the same FC-to-SCSI bridge, the SCSI devices in each library partition are preferably presented as LUNs in the aforementioned OS-friendly manner. This is preferably accomplished by numbering the LUNs as presented to each host contiguously starting from zero. So if devices in a partition are split across several bridges, a number of target SCSI-ID's with LUNs starting from zero under each target SCSI-ID are preferably employed by each bridge.

Figure 1:
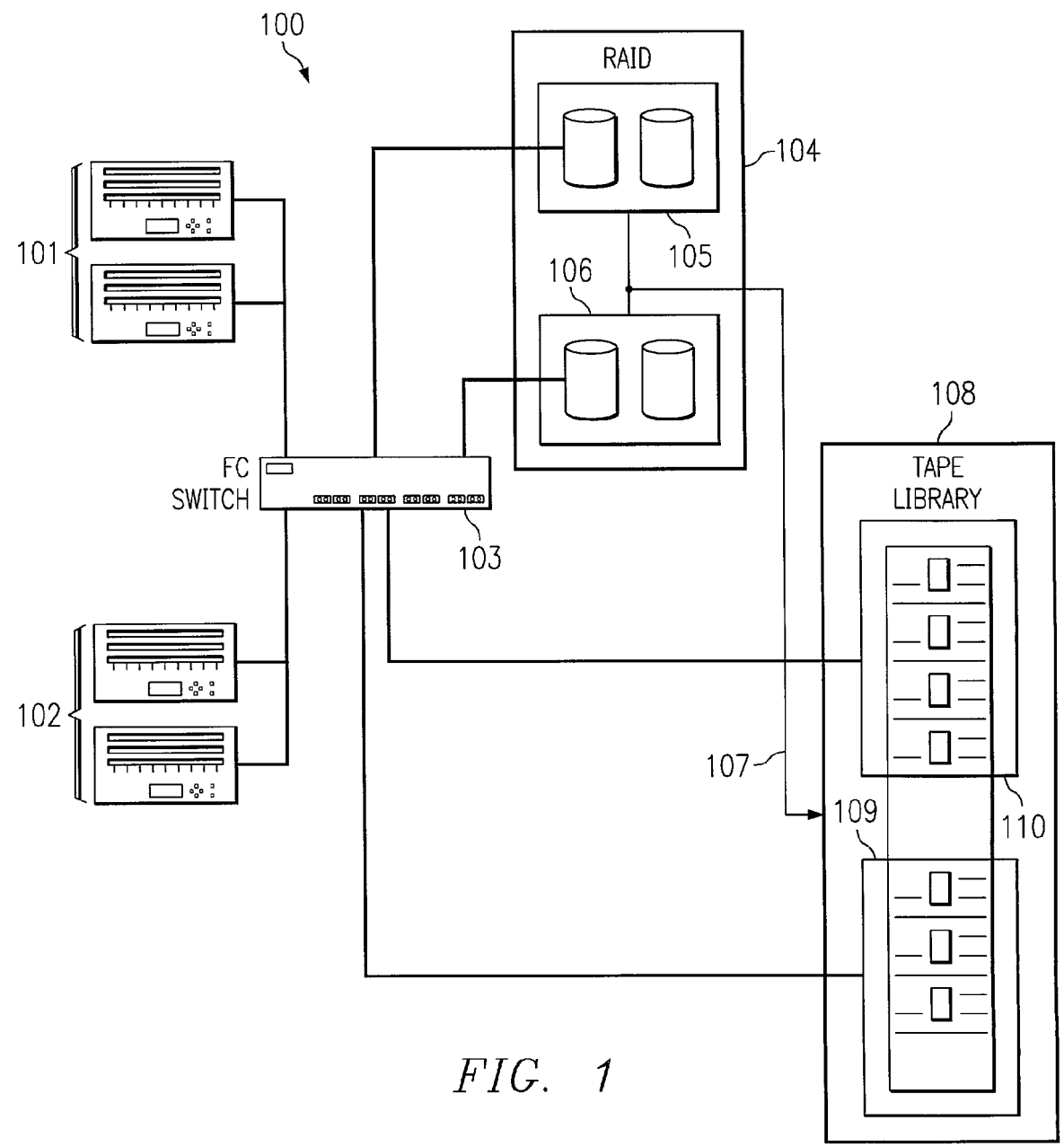
FIG. 1 is a diagrammatic illustration of a SAN employing an embodiment of the present system and method.

Turning to FIG. 1, SAN 100 is shown. By way of example, first and second customer servers 101 and 102 are connected to SAN 100 via FC switch 103. RAID 104 may be partitioned, assigning first partition 105 to server 101 and second partition 106 to server 102 using FC LUN-based existing RAID partitioning methods. Backups, particularly unattended backups such as zero downtime backups (ZDBs) may be performed of the data each server has on the RAID to tape library 108, via interconnectivity, such as ZDB interconnectivity 107, between RAID 104 and tape library 108. Such ZDBs preferably employ data-mover firmware embodied in RAID 104 or other components of SAN 100. ZDBs are preferably carried out without impinging on the processor operations or LAN capacity of servers 101 and 102. Data tape library 108 is preferably partitioned into multiple virtual library partitions. Each library partition preferably has one or more physical tape drives, a unique subset of the library media slots, and a dedicated library changer device LUN assigned to the partition. Such a partitioning system and method is disclosed in the aforementioned U.S. Pat. No. 6,839,824, entitled "System and Method for Partitioning A Storage Area Network Associated Data Library Employing Element Addresses", and U.S. Pat. No. 6,715,031, entitled "System and Method for Partitioning a Storage Area Network Associated Data Library". The present system and method may be used to insure that backup or library data for server 101 is maintained in partition 109 separate from data for server 102, and that the backup or library data of server 102 is maintained in partition 110 separate from data for server 101. Such partitioning ensures that the servers may not access each other's data even though it is maintained in the same physical library.

Figure 2A:
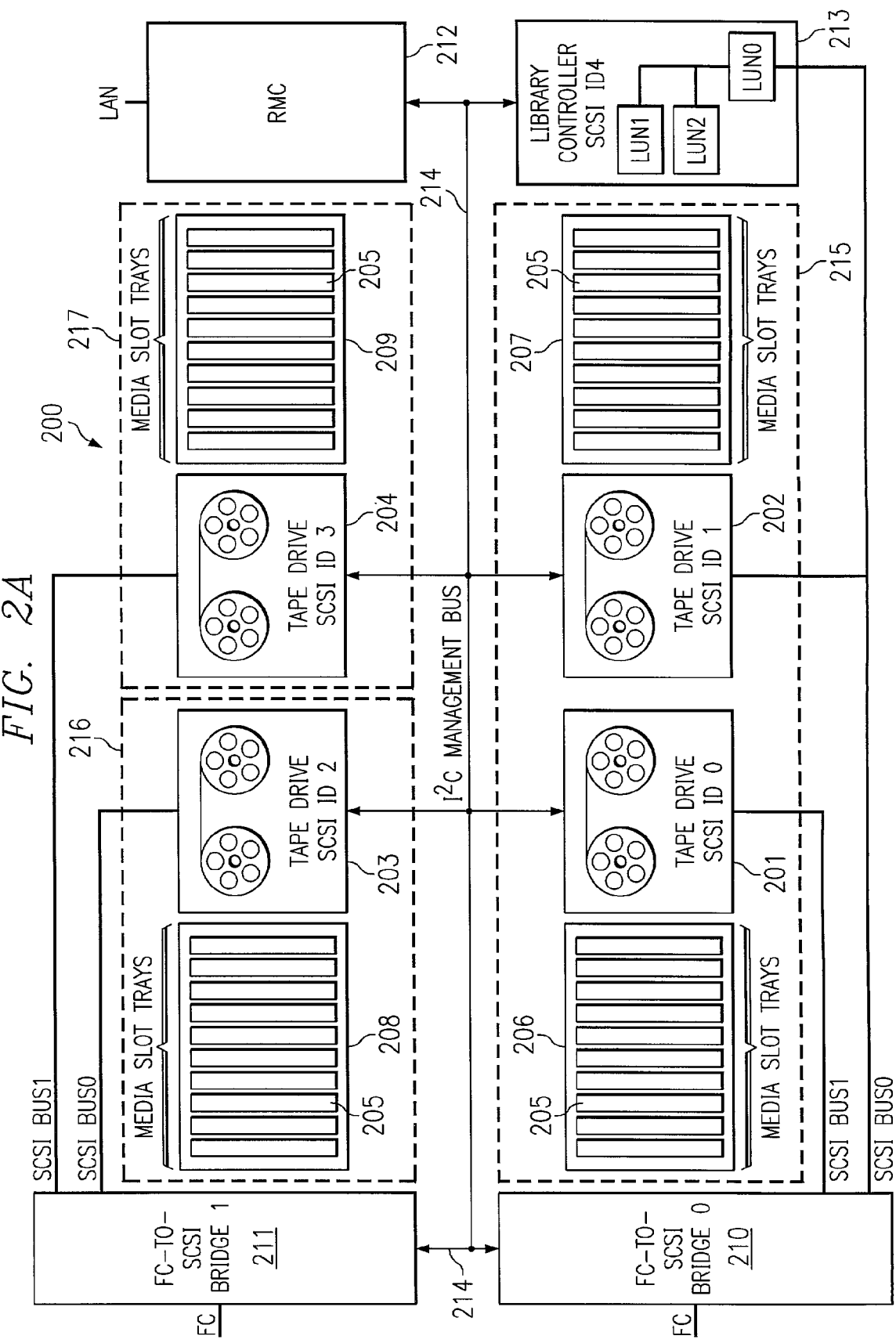
FIG. 2A is a diagrammatic illustration of an example of a data library employing an embodiment of the present system and method.

Data tape library 200 employing a preferred embodiment of the present system and method is illustrated in FIG. 2A as an example of a library that may be employed as library 108 of FIG. 1. However, other library designs and/or capacities may embody the present system and method. Exemplar data tape library 200 has four data transfer elements, in the form of tape drives 201–204; forty media storage slot elements 205, that are shown organized into four trays 206–209 of ten slots 205 each; two FC-to-SCSI bridges 210 and 211; a library management interface card or remote management card (RMC) 212; and library controller 213. Tape drives 201–204, FC-to-SCSI bridges 210 and 211, RMC 212 and library controller 213 preferably communicate with each other using an inter-integrated circuit (I$^2$C) serial management bus 214 and/or automated control interface (ACI) 214 or the like. Any of tape drives 201–204 may be SCSI-based devices or FC tape drives that may employ cartridge memory (CM) reading functionality.

For partitions to employ the present system and method library media slots 205 and tape drives 201–204 should be assigned to each partition, and a virtual library controller should be addressable with respect to each partition. The slots may be assigned by trays or individually. The example partitioning shown in FIG. 2A is indicated by boxes 215, 216 and 217. Import/export elements or mailslots may be assigned to each partition or configured for use by the entire library. Preferably, easily accessible media storage slots may be configured as mailslots by the present invention. For the partitioning system and method to be transparent to a user server, the library robotic arm (not shown) used to move media from slots to drives is preferably shared among user servers. However, it should appear to each server that it is the owner of the arm.

SCSI library controller 213, preferably with a separate LUN presented for each library partition, LUN-0 for partition 215, LUN-1 for partition 216 and LUN-2 for partition 217, is also connected to one of the FC-to-SCSI bridges 210. Because of this complexity, the control of the FC-LUN security is preferably via a library subsystem management interface of RMC 212, which is connected to FC-to-SCSI bridges 210 and 211 via a private management network such as I$^2$C bus 214. Thereby, users may configure security for each library partition via a library web management interface, rather than being required to configure the security separately for each FC-to-SCSI bridge 210 and 211 attached to library 200. As the FC-LUN security in the bridges is preferably configured via the management interface of the tape library in the present system and method, this configuration takes place out-of-band, not through the SCSI bus(es) used to carry user data.

Figure 2B:
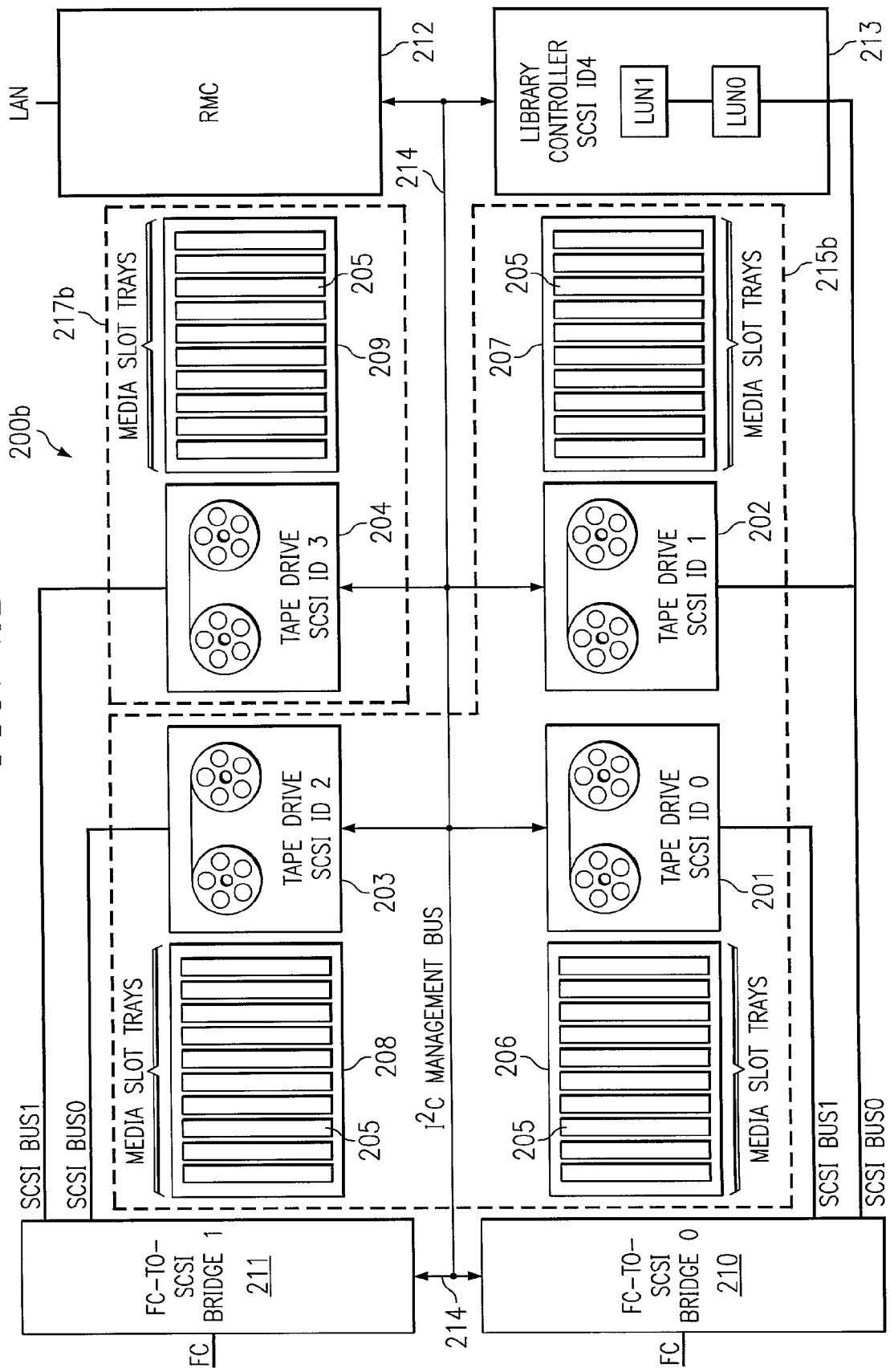
FIG. 2B is a diagrammatic illustration of a second example of a data library employing an embodiment of the present system and method.

With attention directed to FIG. 2B, data tape library 200b employing a preferred embodiment of the present system and method has partitions 215b and 217b and may also be employed as library 108 of FIG. 1. In FIG. 2B, partition 215b is assigned library controller LUN-0 and partition 217b is assigned library controller LUN-1. Drives 201, 202 and 203 of partition 215b are connected to two FC-to-SCSI bridges 210 and 211. Drives 201 and 202 of partition 215b are connected and FC-to-SCSI bridge 210 and drive 203 of partition 215b is connected to FC-to-SCSI bridge 211. Drive 204 of partition 217b is connected to FC-to-SCSI bridge 211.

The tape library management firmware preferably maintains which resources in tape libraries 200 and 200b, such as tape drives 201–204, media slots 205 and changer LUNs, are members of which library partition 215, 216, 217, 215b or 217b. Therefore, when a user sets security for specific library partition according to a preferred embodiment, the library management firmware sends a request over management network such as I$^2$C 214 or the like, to each FC-to-SCSI bridge 210 or 211 that has devices that are part of that library partition attached. A FC-to-SCSI bridge that has library changer device and SCSI controller 213 attached, for example bridge 210, will be affected by any library partition security changes, since every library partition contains one of the SCSI ID LUNs of library changer/controller 213.

Preferred process 300 used to set up security or to enter a security setting change is illustrated in FIG. 3. According to a preferred embodiment a user should enter, via a web management interface or the like hosted by the RMC, a list or one or more WWNs of servers authorized to access a subject library partition at box 301. Preferably, the RMC firmware determines which FC-to-SCSI bridges are affected by a security change at box 302, and sends a security configuration request for that library partition to the affected bridges over the management interface at box 303. For the specified library partition, the security configuration request to each affected FC-to-SCSI bridge preferably contains a partition ID, a list of authorized WWNs for that partition, and a list of which SCSI device Bus/ID/LUN objects attached to the bridge are members of that partition.

Preferably, when a FC-to-SCSI bridge receives a security configuration change request over its management interface, the bridge checks, at 304, that the list of SCSI Device Bus/ID/LUN objects included in the request are a valid subset of the SCSI devices attached to the bridge. The bridge firmware should include any tape drives that have been set to offline status via the library management interface in the check to avoid unwarranted mismatches. If there is a mismatch between the list of objects in the security request and those attached to the bridge, the security request will preferably be rejected with an error indicating the mismatch, box 305. If the SCSI Bus/ID/LUN objects in a security request match the bridge attached devices, then the bridge firmware will preferably add the new library partition security information into the security lookup-table held by the bridge firmware (box 306) as indicated below. Preferably, the security look-up table is held in non-volatile memory in the bridges and is indexed by authorized WWNs, not by SCSI Bus/ID/LUN objects. This facilitates providing OS-friendly mapping as also discussed below.

Preferably, the default security state of the FC-to-SCSI bridges is a single unsecured entry in the security look-up table which lists all of the devices attached to the bridge by SCSI Bus/ID/LUN. So, in accordance with an embodiment of the present invention, initially any host is preferably authorized to access any of the attached devices. Also, the default partition ID is preferably set as 0. Therefore, according to this embodiment, by default the entire library is initially partitioned as a single unsecured partition with the partition ID of 0, until altered via a web interface, library control panel or other means. The library management firmware preferably assigns a unique partition ID for each new partition it is directed to create, preferably the same as the virtual changer LUN assigned to that library partition. However, the partition ID may be any relatively unique number.

With attention directed to FIG. 4, each row 401–405 of security look-up tables 400 may represent the SCSI Bus/ID/LUN objects 406 of active partitions that are available to a specified initiator WWN 407 along with the partition number of each SCSI Bus/ID/LUN object. The exemplar tables 400 of FIG. 4 correspond to illustrated example library 200 of FIG. 2, with partition-ID 0 corresponding to partition 215 using virtual library controller LUN-0, partition-ID 1 corresponding to partition 216 using virtual library controller LUN-1 and partition-ID 2 corresponding to partition 217 using virtual library controller LUN-2. Preferably, a partitioned library may be viewed by a set of hosts as specified in look-up table 400, for example, partition-ID 0 is secured and can only be seen by the host which has WWN_1; partition-ID 1 is secured and can only be seen by the host which has WWN_2; and partition-ID 2 is unsecured and can be seen by all hosts on the SAN or that may have access to the library.

In the example illustrated in FIG. 4, security configuration tables 400 for bridge 0 and bridge 1 are shown. Each entry 401–405 in bridge security configuration tables 400 should also maintain a FC source ID 408 to WWN mapping 407. FC commands do not contain the WWN of the originating host, but use source ID 408. The bridge firmware should gather information regarding source ID to WWN mappings from a name server at login, and issue a request state change notification to the name server to be informed of any changes to these mappings. If new WWNs are added to the table the bridge should query the name server for the source ID of this new WWN. Disabled elements, elements not configured as part of an active partition should not appear in the look-up table. Unsecured entry 403 and 405 contain any library partitions configured as unsecured and thus are available to any initiator WWNs 407. Device objects 406 are shown ordered from left to right in terms of the device bus, SCSI ID and LUN, the partition ID preferably does not affect the device object order.

Preferably, source ID 408 of each incoming command is compared against tables 400 and used to determine security access as indicated below. If source ID 408 matches row 401, 402, or 404 in tables 400 then a temporary virtual device object list is made by first taking the device objects in the row matching the source ID 408 and then appending the device objects of unsecured lists 403 and 405 to the temporary virtual device object list. The FC target LUN in the FC command is then remapped/mapped to a target Bus/ID/LUN on the bridge by counting along the device object entries in the temporary list.

In example tables 400 of FIG. 4, the server with WWN_1 is authorized to access, and can see presented as LUNs, device resources 409, 410 and 411 in library partition 0 on bridge 0, which are SCSI-ID0/LUN-0 on Bus 1 of bridge 0 (409) as well as SCSI-ID1/LUN-0 (410), SCSI-ID4/LUN-0 (411) on Bus 0 of bridge 0. Additionally, the server with WWN_1 can access the device resources in unsecured library partition 2, which is SCSI-ID4/LUN-2 on Bus 0 (412) of bridge 0. It can also access the device resources in unsecured library partition 2 (413) on bridge 1, which is SCSI-ID3/LUN-0 on Bus 1 (413) of bridge 1. Similarly, as shown in rows 402 and 404 of tables 400, the server with WWN_2 is authorized to access the resources of library partitions 1 and 2 on both bridges 0 and 1 (414 and 415, respectively), as well as the resources of unsecured partition 2 (412 and 413). A server with an unrecognized WWN, such as WWN_3 in this example is authorized to access the device resources on unsecured library partitions Partition ID 2 on bridges 0 and 1 (412 and 413).

FIGS. 5A and 5B make up temporary device mapping 500 of the tables of FIG. 4 organized into temporary device object lists 501–503. For purposes of illustration FIGS. 5A and B parenthetically relate the reference numerals of FIGS. 2 and 4. Each bridge presents the device resources a host has access to on that bridge starting from LUN-0 as depicted in column 504. For example, as shown in temporary device object list 501, if the host with WWN_1 sends a SCSI command to FC LUN-0 on bridge 0, then it would be directed to first device 409 in the list for WWN_1 entry 401. If the command from WWN_1 was sent to FC LUN-1 on bridge 0 then it would be directed to second device 410 in WWN_1 list 401. If the command from WWN_1 is sent to LUN-2 on bridge 0 then it is directed to third, and last device 411 in WWN_1 list 401. If the command from WWN_1 was sent to LUN-3 on bridge 0 then it would be directed to first device 412 on bridge 0 in unsecured list 403.

Similarly, turning to temporary device list 502 when the host with WWN_2 sends a SCSI command to FC LUN-0 on bridge 1, then it would be directed to device 415 WWN_2 entry 402. If the command from WWN_2 is sent to LUN-0 on bridge 0, then it would be directed to device 414 in WWN_2 entry 404. If the command from WWN_2 is sent to LUN-1 of bridge 1, then it is directed to device 413 in unsecured list 405. If the command from WWN_2 was sent to LUN-1 of bridge 0, then it would be directed to unsecured device 412 in unsecured list 403.

If source ID 408 does not match any row in the table then temporary virtual device object list 503, made up of only device objects 412 and 413 in unsecured lists 403 and 405 is created. The FC target LUN in the FC command is then mapped to a target Bus/ID/LUN on the bridge by counting along the device object entries in the temporary list. For example, using the example look-up table for bridge 0, if a host not in table 400, for example WWN_4, sends a SCSI command to FC LUN-0 on bridge 0, then it would be directed to first device 412 on bridge 0 in the list for unsecured entry 403.

This system and method not only provides complete secure access to the devices, it also provides an OS-friendly LUN mapping scheme so that each server host will always see its library resources starting at LUN-0. This facilitates the use of conventional backup software with a partitioned data tape library.

Turning to FIG. 6, when a valid security configuration request is received by a bridge, the bridge firmware should process the request employing the following steps to carry out step 306 of FIG. 3 described above. First, all device objects in all rows in the bridge security look-up table that match the partition ID are removed from the security look-up table, box 601. If the security configuration request contains disabled elements at 602, step 306 is completed for these elements, as all entries for the partition were disabled as part of the removal step of box 601. These devices are now disabled and no longer addressable until added back into an active partition.

If at 602 some or all of the device objects of the request are not to be disabled, a determination is made at 603 if the security configuration request contains an unsecure command. If the security configuration request contains an unsecure command, the list of device objects from the security configuration request, with partition ID information, are added to the unsecured row in the table, at box 604, enforcing bus/ID/LUN orderings.

Next, if the security configuration request contains a list of WWNs at box 605, a check is preferably made to see if each WWN matches an existing look-up table entry. If each WWN does not match an existing look-up table entry at 606, then a new entry to the look-up table for each unmatched WWN is preferably added at box 607. The new device object entries are based on the SCSI Bus/ID/LUN objects and the partition ID contained in the security configuration request and are added to the bridge security look-up table, enforcing bus/ID/LUN ordering.

If a WWN matches an existing look-up table row at 606, the device objects, partition ID/SCSI Bus/ID/LUN combinations, in the security configuration request are added to the bridge security look-up table for that entry at box 608, enforcing bus/ID/LUN ordering.

If a FC-to-SCSI bridge supports data mover LUNs for unattended direct back-up of RAID data or the like, then the security of the data-movers can also be configured by sending a security configuration request to on FC-to-SCSI bridge. The data-mover LUNs will have their own Bus/ID/LUN on the bridge and will preferably be subject to the LUN ordering scheme implemented by the bridge.

An advantage of the present system and method is that security configuration changes to the look-up table are preferably made to devices inside a specific library partition. Thus, any SCSI commands currently active to devices or being carried out by devices in other partitions on the same FC-to-SCSI bridge are unaffected by the security change If the library management interface allows a user to manually change the SCSI ID of devices that are attached to the FC-to-SCSI bridges, this operation is preferably integrated with the present security system and method. To that end, any SCSI ID change via the management interface should also trigger a security configuration request for the affected library partition to its FC-to-SCSI bridge(s).

A security configuration erase command should be available over the FC-to-SCSI bridge $I^2C$ management interface.

Therefore, if a user wishes to set the library back to factory defaults or if the library management firmware detects a replacement FC-to-SCSI bridge that already contains security information from another library, the library management firmware may clear that security information. The FC-to-SCSI bridge security can then be configured with a series of security configuration requests. A security configuration report command is preferably available over the FC-to-SCSI bridge I$^2$C management interface, so that the library management firmware can read a FC-to-SCSI bridge's current security configuration.

Preferably, if a bridge detects security configuration problem such as LUN mismatches, an invalid security configuration request, or if on power up a bridge controller issues an alert that it has been changed and needs reconfiguring, the bridge preferably sends a security configuration status alert to the RMC.

Preferably, partition IDs and the library controller partition LUNs are persistent, even if a user deletes a partition. To that end, a partition ID may be identical to the partition LUN on the library controller. For example, if a user configured partitions 0, 1 and 2 and then later deleted partition 0, then partitions 1 and 2 should still exist and should still be accessed via LUNs 1 and 2 on the library controller. Therefore, when a partition is deleted the remaining library controller partition LUNs are not renumbered in the security look-up table as such reordering could mean that the library changer device would appear as different SCSI devices to server operating systems. When a partition is created the next available partition number, starting from 0, is used, so in the above example, the next partition created will preferably be assigned the partition number 0 and will preferably be addressed on LUN-0.

In an alternative embodiment, the library management firmware updates the entire security look-up table for all attached FC-to-SCSI bridges when any security configuration change is made by a user. In this alternative embodiment, the security configuration request at step 601 of FIG. 6 should be comprised of the entire security look-up table. The library management firmware should process all the library partition security information every time a configuration change is made to any partition, such as adding an authorized WWN. The library management firmware should then convert this security information into a look-up table, formatted similar to the one shown in FIG. 4, including all devices attached to the FC-to-SCSI bridge. However, no partition information would need to be in the alternative security look-up table. This alternative embodiment has the advantage that the FC-to-SCSI bridge firmware is simpler to implement.

The present invention may be used for other types of storage bridges, for example iSCSI-to-SCSI bridges. In such a system and method, the iSCSI equivalent of FC-WWNs, such as iSCSI names, are preferably used to authenticate initiators onto secured partition LUNs.

What is claimed is:

1. A data library system with managed device access, said system comprising:
   at least one partition;
   a plurality of data transfer elements each of said data transfer elements assigned to a partition;
   a plurality of data storage element slots, each of said slots assigned to a partition;
   a library controller comprising a virtual controller for each partition, said virtual controller directing movement of said media to and from said slots assigned to a same partition and to and from said data transfer elements assigned to said same partition; and
   at least one bridge operatively disposed between at least one user and said library, each of said bridges present said data transfer elements and said virtual controllers of each partition to said users as logical components beginning at a same designation for each partition.

2. The system of claim 1 wherein at least one of said at least one partition is secured and access to a particular one of said at least one secured partition is restricted to said users having a unique host device identifier listed in a list of unique host device identifiers for access to said particular partition.

3. The system of claim 2 wherein said list of unique host device identifiers is maintained on said at least one bridge.

4. The system of claim 1 wherein said at least one bridge is a fiber channel to small computer systems interface bridge.

5. The system of claim 2 wherein said unique host device identifiers are world wide names.

6. The system of claim 2 wherein said unique host device identifiers are iSCSI names.

7. The system of claim 1 wherein said logical element designations are fiber channel logical unit numbers.

8. A data library bridge adapted to be operatively disposed between at least one user and said data library, said bridge comprising:
   means for presenting data transfer elements of said data library attached to said bridge as logical units; and
   means for presenting a controller for each partition of said data library as a logical unit, said controller directing movement of media to and from storage element slots of said library assigned to a library partition to and from said data transfer elements assigned to a same partition;
   wherein designations for said logical units in each partition begin at a same number for each partition.

9. The bridge of claim 8 further comprising:
   means for listing unique host device identifiers allowed to access a particular partition; and
   means for securing selected ones of said partitions by limiting access to said particular partition to said users having a unique host device identifier listed by said means for listing.

10. The bridge of claim 8 wherein said bridge further comprises means for providing a network interface using fiber channel protocols.

11. The bridge of claim 10 wherein said bridge further comprises means for providing a library interface using small computer systems interface protocols.

12. A method for partitioning and managing a data library adapted to be attached to a storage area network, said method comprising:
   establishing a plurality of partitions in said data library, each of said partitions comprising at least one storage element slot and at least one data transfer element;
   controlling movement of media to and from said slots to and from said data transfer elements assigned to a same partition; and
   presenting virtual controllers and said data transfer elements for each of said partitions to users of said library as logical components beginning at a same designation for each of said partitions.

13. The method of claim 12 further comprising:
   securing selected ones of said partitions by assigning a list of unique host device identifiers which may access each of said partitions.

14. The method of claim 13 further comprising:
maintaining said list of unique host device identifiers in at least one bridge disposed between said data library and said users.

15. The method of claim 12 wherein said presenting is carried out by at least one bridge disposed between said data library and said users.

16. The method of claim 13 further comprising:
entering security settings for one of said partitions.

17. The method of claim 16 wherein said entering comprises:
listing at least one unique host device identifier authorized to access said one partition.

18. The method of claim 16 wherein said entering comprises:
determining at least one bridge affected by said security settings.

19. The method of claim 16 wherein said entering comprises:
sending said security setting for said one partition to said at least one affected bridge.

20. The method of claim 16 wherein said entering comprises:
adding said security settings to a security lookup-table maintained by at least one affected bridge.

21. The method of claim 16 wherein said security settings comprise a list of virtual unit designations of at least one of said data transfer elements and said virtual controllers of said one partition attached to at least one affected bridge.

22. The method of claim 21 wherein said adding step further comprises:
removing all data transfer element and virtual controller designations from said look-up table for said one partition.

23. The method of claim 21 wherein said adding step further comprises:
adding listed data transfer elements and virtual controllers to an unsecured row of said table in response to said settings comprising an unsecure command.

24. The method of claim 21 wherein said adding step further comprises:
matching unique host device identifiers listed in said settings to existing look up table entries.

25. The method of claim 21 wherein said adding step further comprises: adding unmatched unique host device identifiers to said table with listed data transfer elements and virtual controllers for said one partition.

26. The method of claim 25 wherein said adding step further comprises:
adding listed data transfer elements and virtual controllers for said one partition to table entries for matched unique host device identifiers.

27. The method of claim 12 wherein said logical element designations are fiber channel logical unit numbers.

28. A partitioned storage area network with a managed attached data library, said network comprising:
a data storage array divided into partitions;
at least one bridge disposed between said array and said library; and
said library comprising:
a plurality of library partitions corresponding to said array partitions;
a plurality of data transfer elements each of said data transfer elements assigned to one of said library partitions;
a plurality of data storage element slots, each of said slots assigned to one of said library partitions; and
a library controller that defines a virtual controller for each of said library partitions, each of said virtual controllers directing movement of said media to and from said slots assigned to a same partition and to and from said data transfer elements assigned to said same partition;
wherein said at least one bridge presents said data transfer elements and said virtual controllers of each of said partitions to users of said network as logical unit numbers beginning at a same logical unit number within each partition.

29. The network of claim 28 wherein a particular one of said partitions is secured at least in part by assigning a list of unique host device identifiers which may access said particular partition.

30. The network of claim 29 wherein said list of unique host device identifiers is maintained on said at least one bridge.

31. The network of claim 29 wherein said unique host device identifiers are world wide names.

32. The network of claim 28 wherein said unique host device identifiers are iSCSI names.

33. The network of claim 28 wherein data mover interconnectivity extends between said array and said library, via said at least one bridge, and said data mover interconnectivity is partitioned and assigned to said corresponding library and array partitions.

34. The network of claim 28 wherein said at least one bridge is a fiber channel to small computer networks interface bridge.

* * * * *

UNITED STATES PATENT AND TRADEMARK OFFICE
CERTIFICATE OF CORRECTION

PATENT NO. : 7,062,614 B2  Page 1 of 1
APPLICATION NO. : 10/032662
DATED : June 13, 2006
INVENTOR(S) : Peter Thomas Camble et al.

It is certified that error appears in the above-identified patent and that said Letters Patent is hereby corrected as shown below:

Title Page, Item (56) Pg 2, "U.S. Patent Documents", in column 1, line 7, below "6,247,096  B1  6/2001  Fisher et al."
insert -- 6,260,120  7/2001  Blumenau et al. --.

Title Page, Item (56) Pg 2, "U.S. Patent Documents", in column 1, line 8, below "6,295,578  B1  9/2001  Dimitroff et al."
insert -- 6,328,766  12/2001  Long --.

Title Page, Item (56) Pg 2, "Foreign Patent Documents", in column 2, line 3, below "EP  1156408  11/2001" insert -- EP 1158386  11/2001 --.

Title Page, Item (56) Pg 2, "Other Publications", in column 2, line 15, below "Jan. 4, 2005." insert -- Foreign Search Report dated Sep. 23, 2005 - 4 pages. --.

Signed and Sealed this

Twenty-third Day of June, 2009

JOHN DOLL
*Acting Director of the United States Patent and Trademark Office*